(12) United States Patent
Ahern et al.

(10) Patent No.: US 9,440,493 B1
(45) Date of Patent: Sep. 13, 2016

(54) TRACTION MATERIAL DISPENSING APPARATUS (71) Applicants: Timothy J. Ahern, Westminster, CO (US); Ron Angstead, Longmont, CO (US)

(72) Inventors: Timothy J. Ahern, Westminster, CO (US); Ron Angstead, Longmont, CO (US)

( * ) Notice: Subject to any disclaimer, the term of this patent is extended or adjusted under 35 U.S.C. 154(b) by 101 days.

(21) Appl. No.: 14/531,848

(22) Filed: Nov. 3, 2014

Related U.S. Application Data (60) Provisional application No. 61/899,429, filed on Nov. 4, 2013.

(51) Int. Cl.
B60B 39/00 (2006.01)
B60B 39/02 (2006.01)
B60B 39/04 (2006.01)
B60B 39/10 (2006.01)

(52) U.S. Cl.
CPC .......... *B60B 39/022* (2013.01); *B60B 39/025* (2013.01); *B60B 39/04* (2013.01); *B60B 39/10* (2013.01)

(58) Field of Classification Search
CPC ... B60B 39/02; B60B 39/021; B60B 39/022; B60B 39/08; B60B 39/10; B60B 39/027; B60B 39/04; B60B 39/06; B60B 39/083; B60B 39/025
See application file for complete search history.

(56) References Cited

U.S. PATENT DOCUMENTS 3,336,064 A * 8/1967 Dzaack ................... B60B 39/02
152/208
3,827,736 A * 8/1974 Mango ................... B60B 39/10
219/202

(Continued)

*Primary Examiner* — Jason C Smith
(74) *Attorney, Agent, or Firm* — Crossley & Stevenson Intellectual Property Law (57) ABSTRACT A traction material dispensing apparatus including at least one of a traction material dispensing unit disposed within a wheel well of a vehicle, proximal both a front and a rear of a vehicle tire. Each traction material dispensing unit includes a storage cartridge, a mounting bracket assembly, and a solenoid housing. A solenoid, a knife, and a stopper are disposed within the solenoid housing. The stopper is in operational communication with the solenoid and is configured to block a pathway of the solenoid. A traction material is disposed within the storage cartridge. A transmitter sends a wireless activation signal to the receiver, which activates the solenoid, in turn actuating the stopper, which releases the traction material from within the storage cartridge onto a road proximal the tire.

13 Claims, 11 Drawing Sheets (56) References Cited

U.S. PATENT DOCUMENTS

| | | | | |
|---|---|---|---|---|
| 4,203,423 A * | 5/1980 | Ricci | B60B 39/023 | 126/271.1 |
| 4,316,625 A * | 2/1982 | Goon | B62D 37/00 | 222/368 |
| 4,848,510 A * | 7/1989 | Ahmed | B60C 27/00 | 180/309 |
| 5,100,175 A * | 3/1992 | Swallow | B60B 39/023 | 239/567 |
| 5,350,035 A * | 9/1994 | Bodier | B60B 39/025 | 180/197 |
| D365,173 S | 12/1995 | Ford | | |
| 5,582,441 A * | 12/1996 | Frost | B60B 39/022 | 188/4 R |
| 6,166,657 A * | 12/2000 | Mann | B60B 39/02 | 340/580 |
| 6,371,532 B1 * | 4/2002 | Skarie | B60B 39/025 | 291/2 |
| 6,488,217 B1 * | 12/2002 | Donastorg | B60B 39/02 | 180/271 |
| 6,848,726 B1 * | 2/2005 | Horsham | B60R 16/0237 | 237/12.3 B |
| 6,946,621 B1 * | 9/2005 | Roseman | B60B 39/025 | 219/202 |
| 7,575,258 B1 * | 8/2009 | Osei-Bosompem | B60B 39/04 | 291/2 |
| 7,976,076 B1 * | 7/2011 | Ahern | B60B 39/10 | 291/38 |
| 8,371,625 B2 * | 2/2013 | Crawford, Sr. | B60B 39/06 | 291/2 |
| 8,465,061 B1 * | 6/2013 | Reid | B60B 39/022 | 291/23 |
| 9,096,983 B1 * | 8/2015 | Mejia | E01H 10/007 | |
| 2004/0070265 A1 * | 4/2004 | Sakai | B60B 39/023 | 303/1 |
| 2006/0060441 A1 * | 3/2006 | Sakai | B60B 39/02 | 191/2 |
| 2014/0081515 A1 * | 3/2014 | Goulet | B61C 15/107 | 701/36 |

* cited by examiner

TRACTION MATERIAL DISPENSING APPARATUS

CROSS-REFERENCE TO RELATED APPLICATIONS

U.S. Provisional Application No. 61/899,429 Filed Nov. 4, 2013

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

On roads in cold regions, ice and snow often inhibit traction. Severe conditions typically require that tire chains be installed, a laborious process, in both installation and removal. Further, tires chains are often only needed for brief periods, with sufficient traction available before, after, and between such periods. Tires chains also require significant speed reduction. Various devices have been proposed that scatter traction enhancing materials, such as sand, salt, and magnesium chloride, for example. These devices, though, have experienced design and performance flaws. Additionally, some such devices are overly complex and require various forms of delivery enhancement in order to force traction material onto the road surface. The present apparatus provides solutions to the previously experienced problems of obtaining traction.

FIELD OF THE INVENTION

The traction material dispensing apparatus relates to devices for improving vehicle traction and more especially to a traction material dispensing apparatus that conforms to a wheel well shape and dispenses traction material both in front of and behind a vehicle tire.

SUMMARY OF THE INVENTION

The general purpose of the present traction material dispensing apparatus, described subsequently in greater detail, is to provide a traction material dispensing apparatus which has many novel features that result in a traction material dispensing apparatus which is not anticipated, rendered obvious, suggested, or even implied by prior art, either alone or in combination thereof.

To accomplish this, the present traction material dispensing apparatus includes at least one of a traction material dispensing unit disposed within at least one of a wheel well of a vehicle. Each traction material dispensing unit has an arcuate shaped storage cartridge, a solenoid housing, and a mounting bracket assembly.

The storage cartridge includes a top end spaced apart from a bottom end, a circumferential outer perimeter, and an inner chamber. A lid of the storage cartridge is disposed upon the top end and partially encloses the inner chamber. A cylindrical engagement member is medially disposed upon the lid. An aperture is medially disposed upon the cylindrical engagement member. A tinfoil seal is disposed upon the bottom end of the storage cartridge enclosing the inner chamber proximal the bottom end.

The inner chamber is filled with a traction material. It is envisioned that the traction material can be composed of, comprised of, or selected from the group consisting of salt, sand, magnesium chloride, cat litter, and gravel, or some combination thereof. Additionally, other friction creating materials are envisioned that could serve as the traction material without deviating from the spirit and scope of the invention.

The mounting bracket assembly includes an arc-shaped bracket having an upper portion and a lower portion. A perpendicular attachment piece is disposed upon the upper portion, while a hinge is disposed upon the attachment piece. A top cover is disposed upon the hinge. The top cover is configured to rotate upwardly on the hinge. The top cover is also configured to engage the engagement member of the lid and enclose the aperture of the engagement member retaining the lid, and thereby, retaining the entire storage cartridge between the top cover and the solenoid housing.

The solenoid housing includes a housing cavity, a dispensing door, a connection fitting, and a solenoid bracket. The connection fitting is reversibly engaged with the bottom end of the storage cartridge, the bottom end configured to fit snugly within the connection fitting. The dispensing door is disposed at a lower end of the solenoid housing.

A solenoid is disposed within the housing cavity. The solenoid is mechanically engaged with a conically shaped stopper. The solenoid is configured to actuate the stopper within the housing cavity. The stopper is configured to reversibly engage the dispensing door and fully enclose a pathway of the dispensing door. The conical shape is critical to the functionality of the stopper as it better enables the stopper to engage and disengage through flowing traction material. The conical shape of the stopper parts the flowing traction material better than non-conically shaped stoppers.

The solenoid is in operational communication with a receiver. The receiver is in wired operational communication with a vehicle battery and the solenoid. The receiver is in wireless operational communication with a transmitter. The receiver is configured to receive a wireless activation signal from the transmitter. The receiver is also configured to transmit the activation signal to the solenoid, the solenoid being configured to activate upon receipt of the activation signal.

A solenoid mounting bracket is disposed upon the solenoid housing. Each of the solenoid mounting bracket and the mounting bracket assembly have a plurality of threaded members for mounting each of the solenoid housing and the top cover to the at least one wheel well of the vehicle. The storage cartridge is removably disposed between each of the top cover and the connection fitting of the solenoid housing.

A knife is disposed within the solenoid housing. The knife is configured to automatically puncture the tinfoil seal of the storage cartridge as the storage cartridge is installed onto the solenoid housing. The knife is also configured to push the seal to the side and out of the way of the dispensing traction material as gravity causes the sand to move downward through the cut or torn opening and into the top of the solenoid housing assembly. A first taller cutter point makes a first penetration into the seal, then a pair of side blades open the seal further and continue to push the torn material to the side at a 90-degree angle from the original cut. Each of the housing cavity of the solenoid housing, the inner chamber of the storage cartridge, and the pathway of the dispensing door are adjoining.

In operation, a user engages the storage cartridge filled with the traction material with the connection fitting of the solenoid housing. In doing so, the knife of the solenoid housing pierces the tinfoil seal of the storage cartridge. Piercing of the tinfoil seal causes the traction material of the storage cartridge to enter into the housing cavity of the solenoid housing. Upon activation of the transmitter by a user, the receiver receives the activation signal from the transmitter and transmits the activation signal to the solenoid, the solenoid then actuates the stopper moving the stopper away from the dispensing door, exposing the pathway to the housing cavity of the solenoid housing, thus allowing the traction material to flow from inner chamber of the storage cartridge, through the housing cavity of the solenoid housing, and out of the pathway of the dispensing door due to the effects of gravity.

It is envisioned that the at least one traction material dispensing unit includes a first traction material dispensing unit and a second traction material dispensing unit disposed within the at least one wheel well of the vehicle. The first traction material dispensing unit is disposed proximal a rear of a vehicle wheel, while the second traction material dispensing unit is disposed proximal a front of the vehicle wheel.

An arched attachment bracket is disposed between and in operational communication with each of the first traction material dispensing unit and the second material dispensing unit. The attachment bracket has both a first end and a second end. The first end is in operational communication with the perpendicular attachment piece of the first traction material dispensing unit via at least one of the plurality of threaded members. Additionally, the second end is in operational communication with the perpendicular attachment piece of the second traction material dispensing unit via at least one of the plurality of threaded members. The attachment bracket is configured to mount within the at least one wheel well of the vehicle via the plurality of threaded members. It is envisioned that these traction material dispensing units can be either disposable or refillable. It is also envisioned that the storage cartridge can be funnel shaped. This shape allows for the majority of traction material to be stored near the top of the wheel well, up and out of the way from a tire. The lowest section of the wheel well has the least amount of space due to the steering and pivoting of the tires, compression of the suspension going in and out of dips and bumps, and other obstacles that may be encountered while driving. Thus the funnel shape creates the optimal amount of storage for the traction material, proper angle for dispensing the sand, and for opening and closing of a solenoid door or gate.

Thus has been broadly outlined the more important features of the present traction material dispensing apparatus so that the detailed description thereof that follows may be better understood and in order that the present contribution to the art may be better appreciated. The novelty of the present invention lies not only in an apparatus that comprises the aforementioned elements, but also one that consists solely of these elements or a combination thereof.

BRIEF DESCRIPTION OF THE DRAWINGS

Figures

DETAILED DESCRIPTION OF THE DRAWINGS

With reference now to the drawings, and in particular FIGS. 1 through 11 thereof, an example of the instant traction material dispensing apparatus employing the principles and concepts of the present traction material dispensing apparatus and generally designated by the reference number 10 will be described.

Referring to FIGS. 1 through 11 the present traction material dispensing apparatus 10 is illustrated. The traction material dispensing apparatus 10 includes at least one of a traction material dispensing unit 20 disposed within at least one of a wheel well 22 of a vehicle 24. Each traction material dispensing unit 20 has an arcuate shaped storage cartridge 26, a solenoid housing 28, and a mounting bracket assembly 30.

Figure 1:
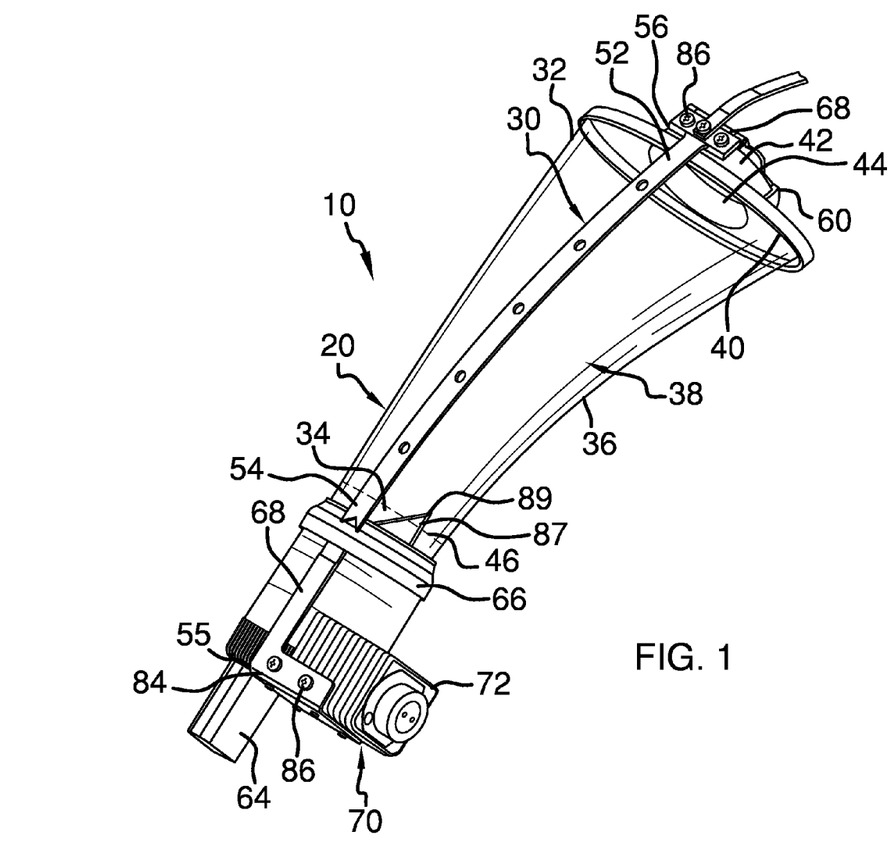
FIG. 1 is an isometric view.
Figure 2:
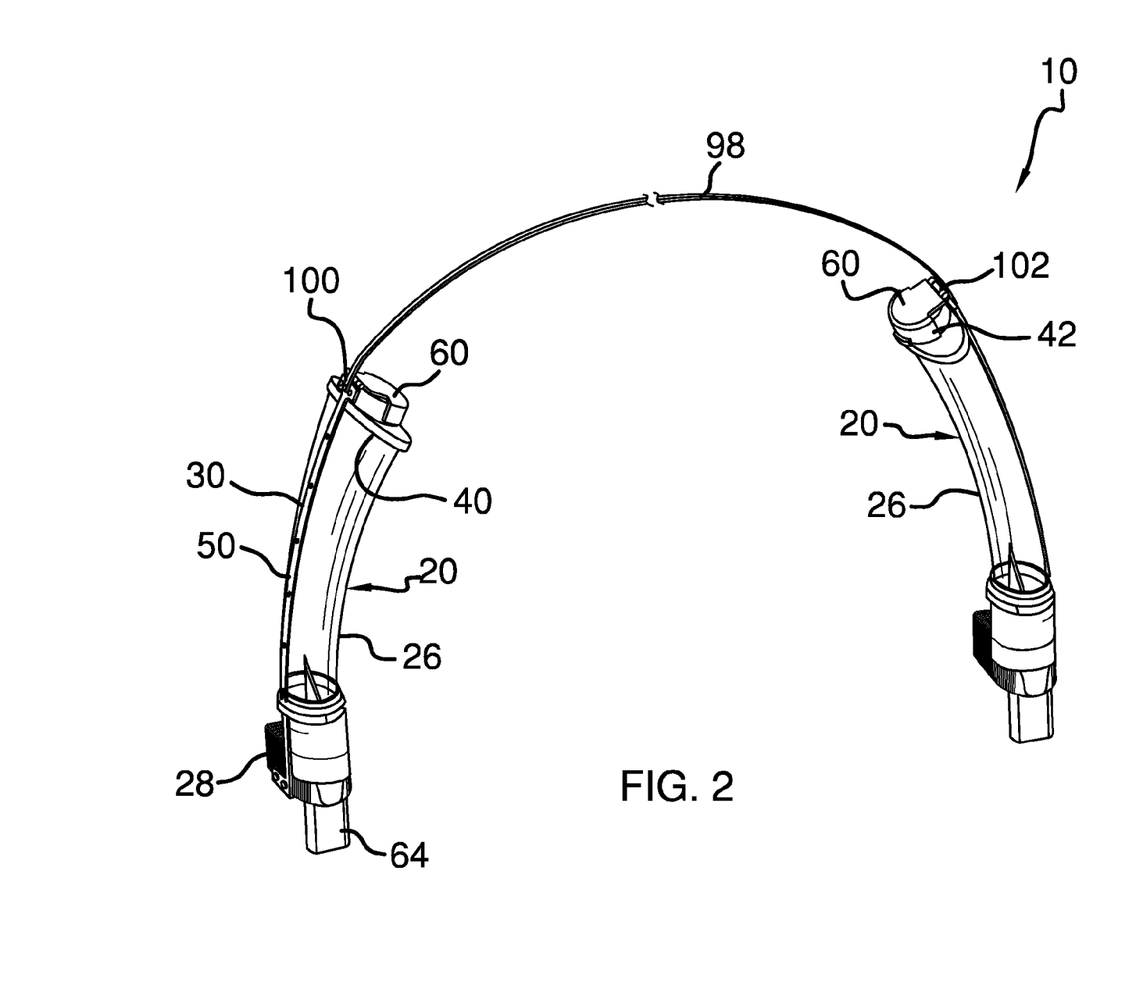
FIG. 2 is an isometric view.
Figure 11:
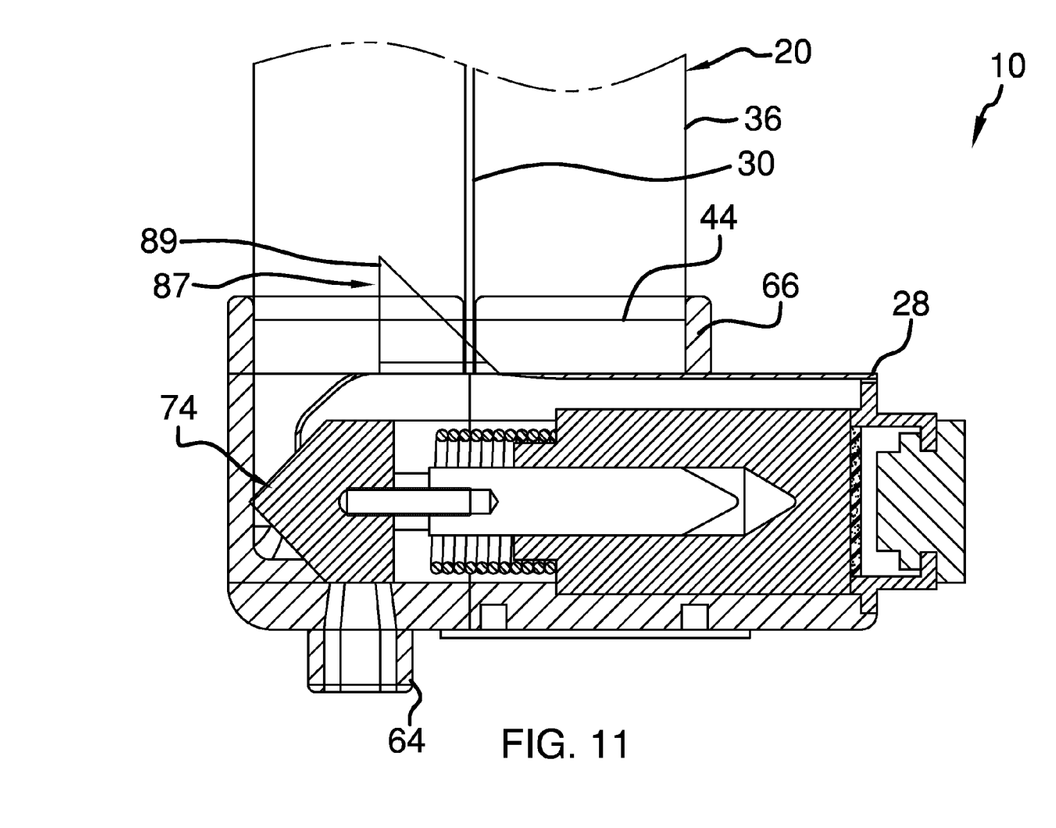
FIG. 11 is a cross-sectional view of the solenoid housing and the storage cartridge.

The storage cartridge 26 includes a top end 32 spaced apart from a bottom end 34, a circumferential outer perimeter 36, and an inner chamber 38. A lid 40 of the storage cartridge 26 is disposed upon the top end 32 and partially encloses the inner chamber 38. A cylindrical engagement member 42 is medially disposed upon the lid 40. An aperture 44 is medially disposed upon the cylindrical engagement member 42. A tinfoil seal 46 is disposed upon the bottom end 34 of the storage cartridge 26 enclosing the inner chamber 38 proximal the bottom end 34.

The inner chamber 38 is filled with a traction material 48. It is envisioned that the traction material 48 can be composed of, comprised of, or selected from the group consisting of salt, sand, magnesium chloride, cat litter, and gravel, or some combination thereof. Additionally, other friction creating materials are envisioned that could serve as the traction material 48 without deviating from the spirit and scope of the invention.

The mounting bracket assembly 30 includes an arc-shaped bracket 50 having an upper portion 52 and a lower portion 54. A perpendicular attachment piece 56 is disposed upon the upper portion 52, while a hinge 58 is disposed upon the attachment piece 56. A top cover 60 is disposed upon the hinge 58. The top cover 60 is configured to rotate upwardly on the hinge 58. The top cover 60 is also configured to engage the engagement member 42 of the lid 40 and enclose the aperture 44 of the engagement member 42 retaining the lid 40, and thereby, retaining the entire storage cartridge 26 between the top cover 60 and the solenoid housing 28.

Figure 5:
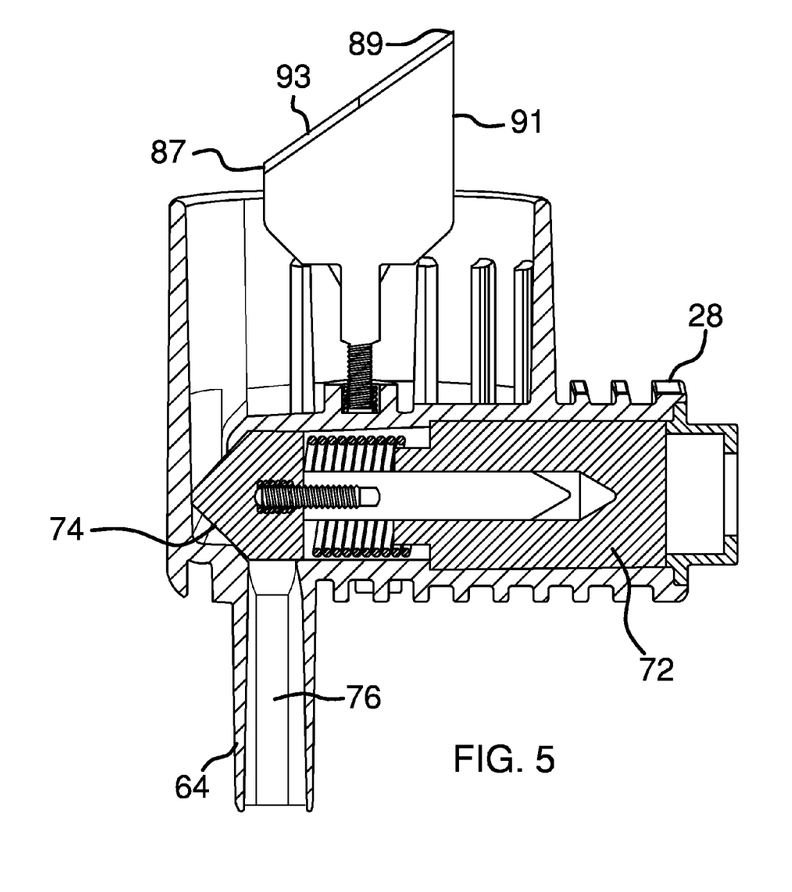
FIG. 5 is a cross-sectional view of the solenoid housing.
Figure 6:
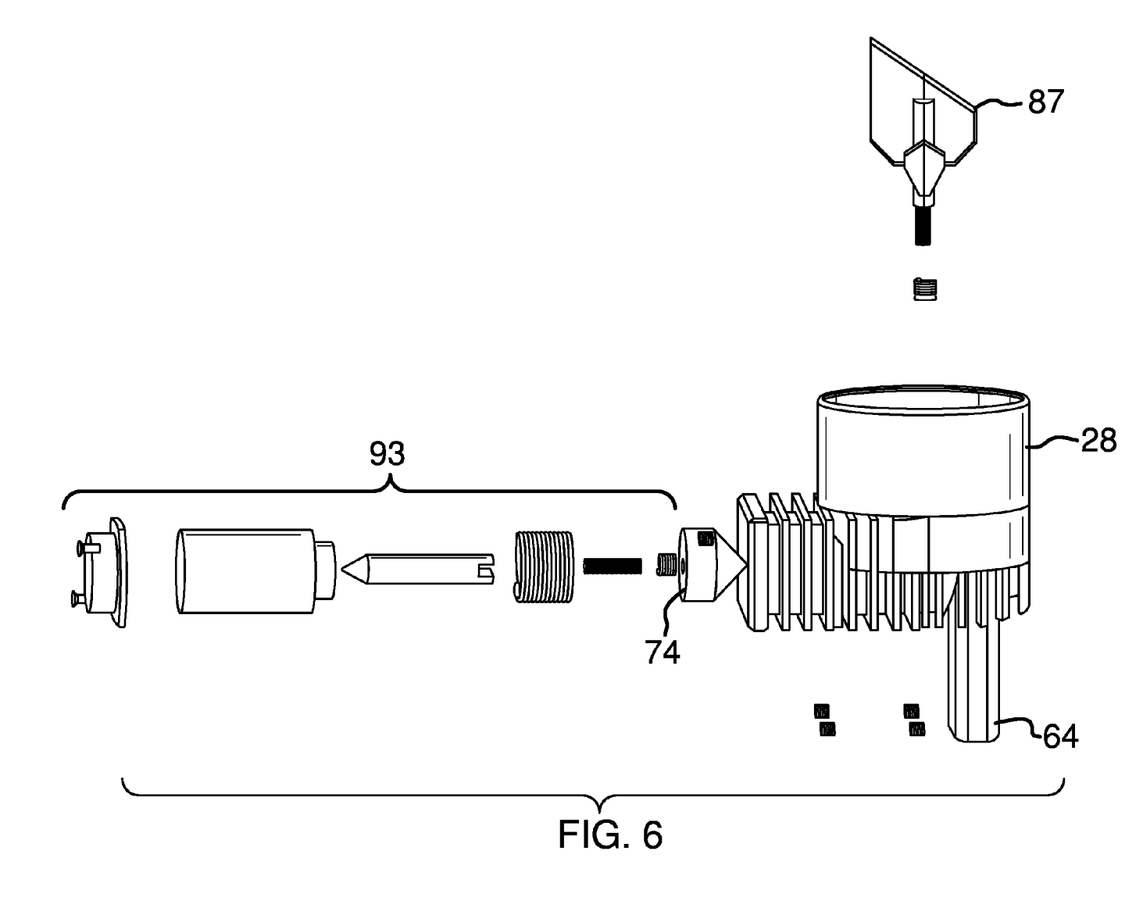
FIG. 6 is an exploded view of a solenoid, the solenoid housing, a stopper, and a knife.
Figure 7:
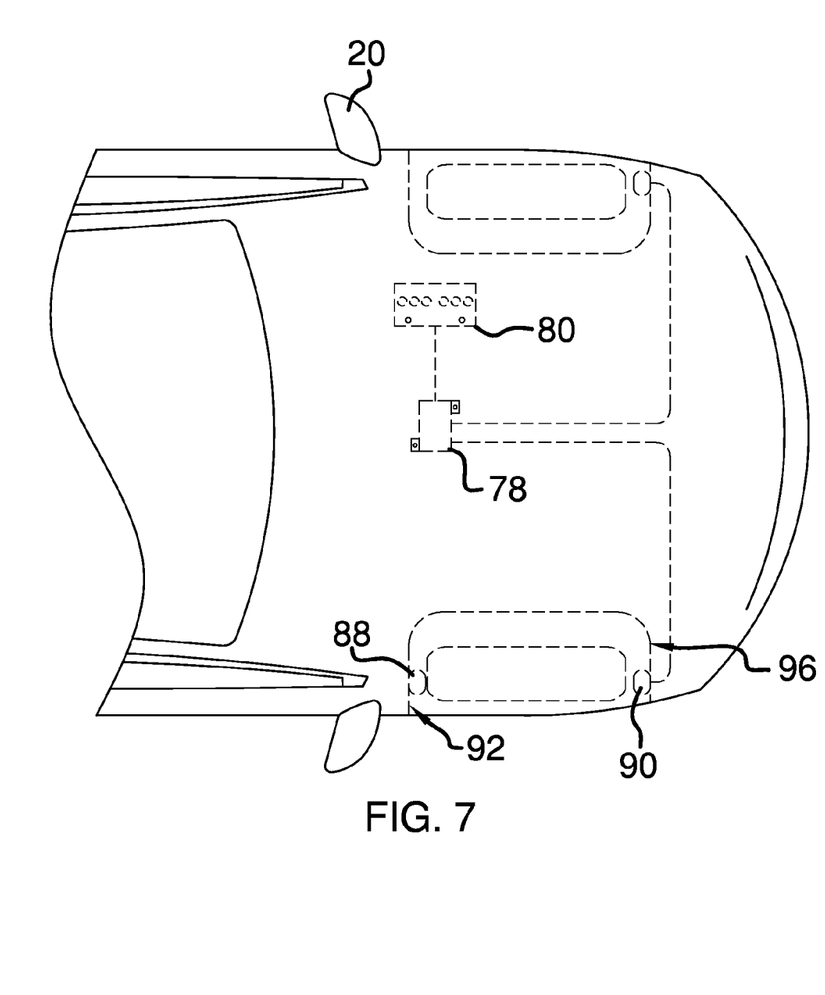
FIG. 7 is an in use view of the operational connections.
Figure 8:
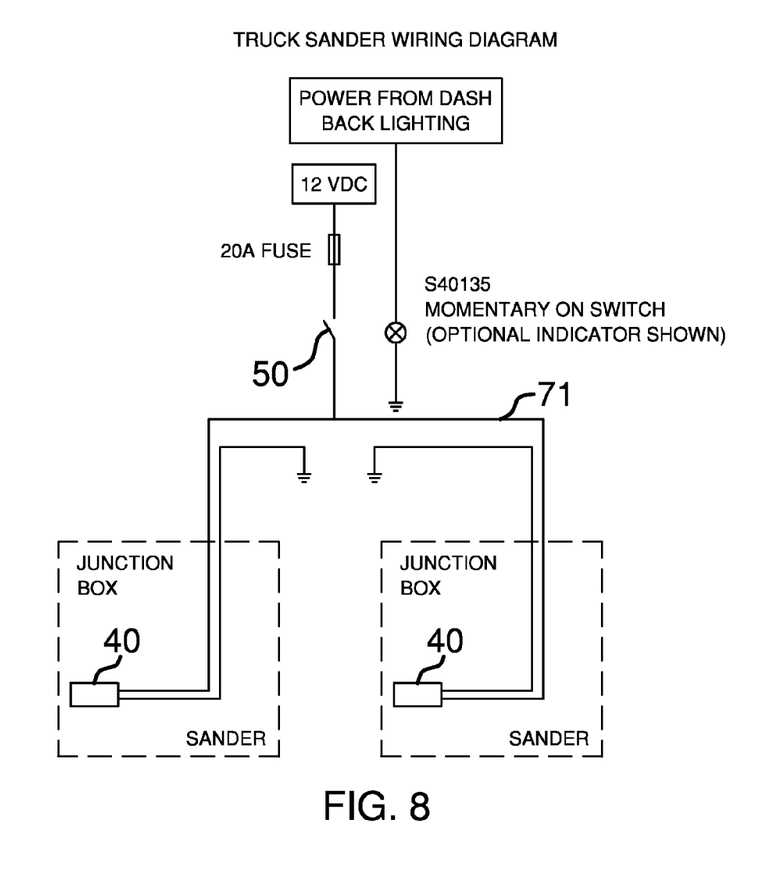
FIG. 8 is a diagram view of the operational connections.
Figure 9:
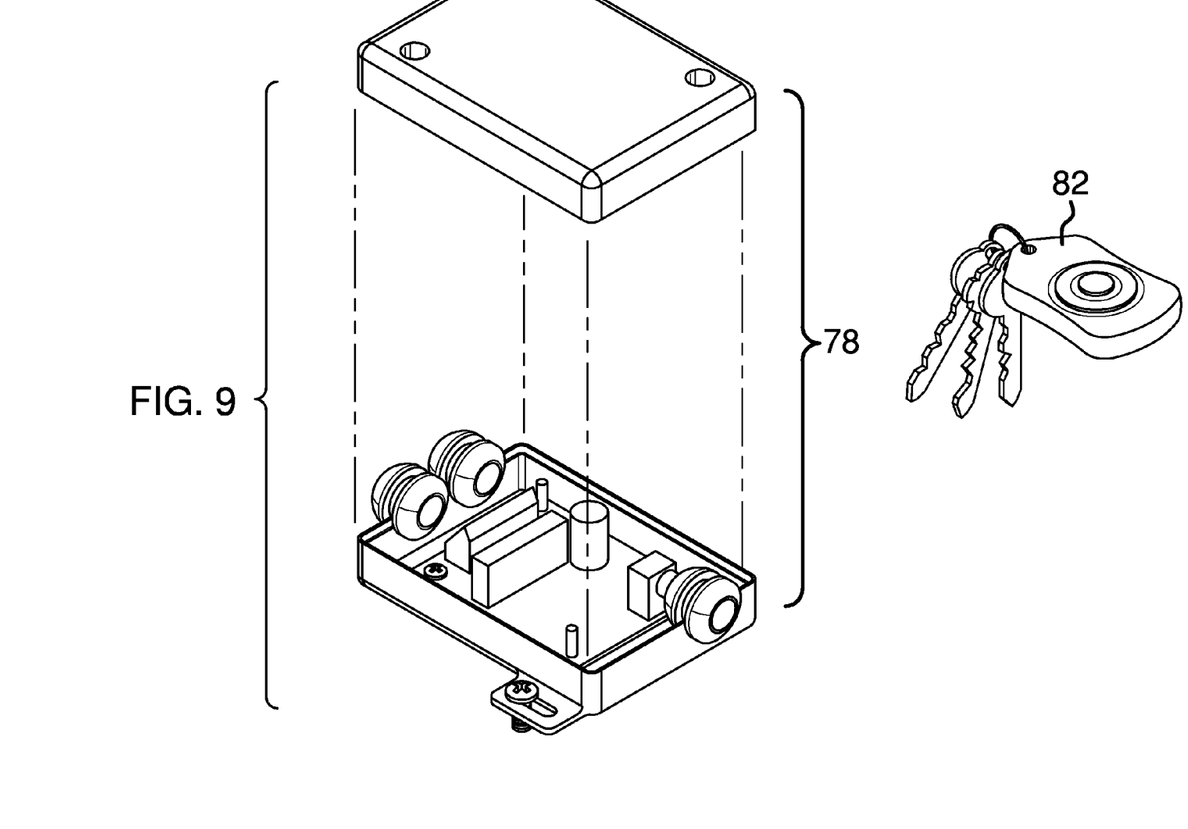
FIG. 9 is an exploded view of the receiver and transmitter.

The solenoid housing 28 includes a housing cavity 62, a dispensing door 64, a connection fitting 66, and a solenoid bracket 68. The connection fitting 66 is reversibly engaged with the bottom end 34 of the storage cartridge 26, the bottom end 34 configured to fit snugly within the connection fitting 66. The dispensing door 64 is disposed at a lower end 70 of the solenoid housing 28.

A solenoid 72 is disposed within the housing cavity 62. The solenoid 72 is mechanically engaged with a conically shaped stopper 74. The solenoid 72 is configured to actuate the stopper 74 within the housing cavity 62. The stopper 74 is configured to reversibly engage the dispensing door 64 and fully enclose a pathway 76 of the dispensing door 64. The solenoid 72 is in operational communication with a receiver 78. The receiver 78 is in wired operational communication with a vehicle battery 80 and the solenoid 72. The receiver 78 is in wireless operational communication with a transmitter 82. The receiver 78 is configured to receive a wireless activation signal from the transmitter 82. The receiver 78 is also configured to transmit the activation signal to the solenoid 72, the solenoid 72 being configured to activate upon receipt of the activation signal. Many wireless operations are known in the art, including RF signaling, Bluetooth, or equivalent wireless technologies.

A solenoid mounting bracket 84 is disposed upon the solenoid housing 28. Each of the solenoid mounting bracket 84 and the mounting bracket assembly 30 have a plurality of threaded members 86 for mounting each of the solenoid housing 28 and the top cover 60 to the at least one wheel well 22 of the vehicle 24. The storage cartridge 26 is removably disposed between each of the top cover 60 and the connection fitting 66 of the solenoid housing 28.

Figure 10:
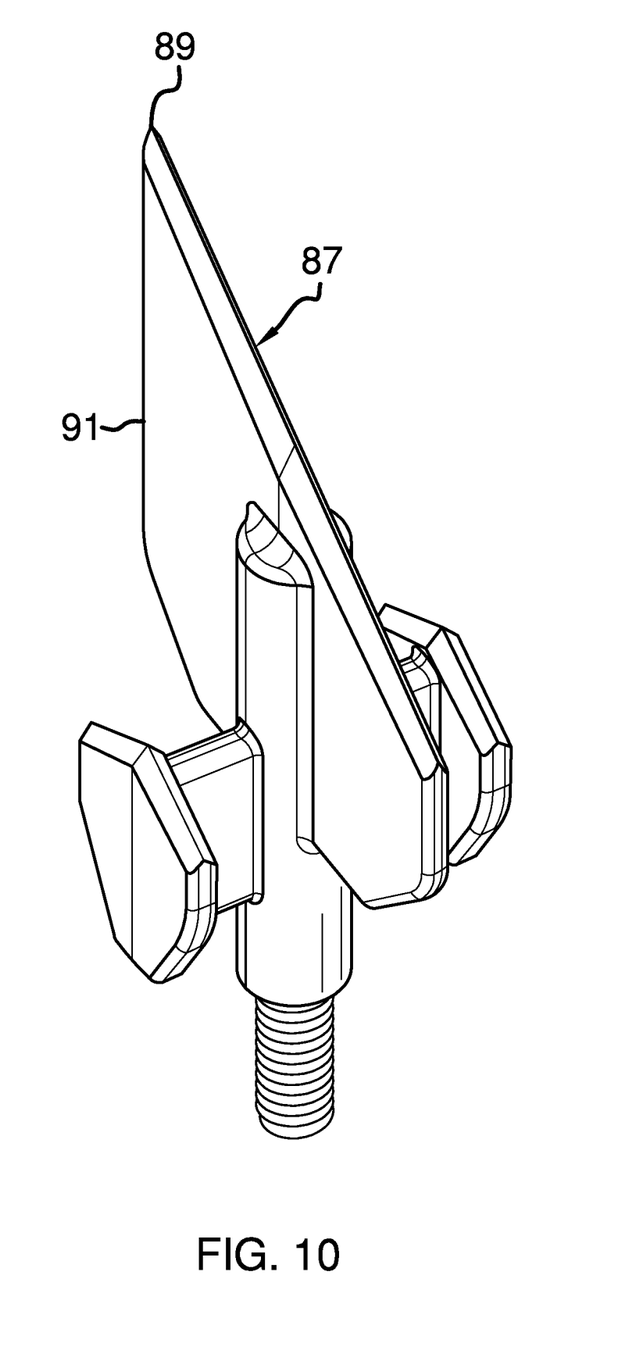
FIG. 10 is an exploded view of the knife.

A knife 87 having an angled blade 93 is disposed within the solenoid housing 28. The knife 87 is configured to puncture the tinfoil seal 46 of the storage cartridge 26. A tallest cutter point 89 of the knife 87 blade 93 makes a first penetration into the seal, then a pair of side blades 91 open the seal further and continue to push the torn material to the side at a 90-degree angle from the original cut. Each of the housing cavity 62 of the solenoid housing 28, the inner chamber 38 of the storage cartridge 26, and the pathway 76 of the dispensing door 64 are adjoining.

Figure 3:
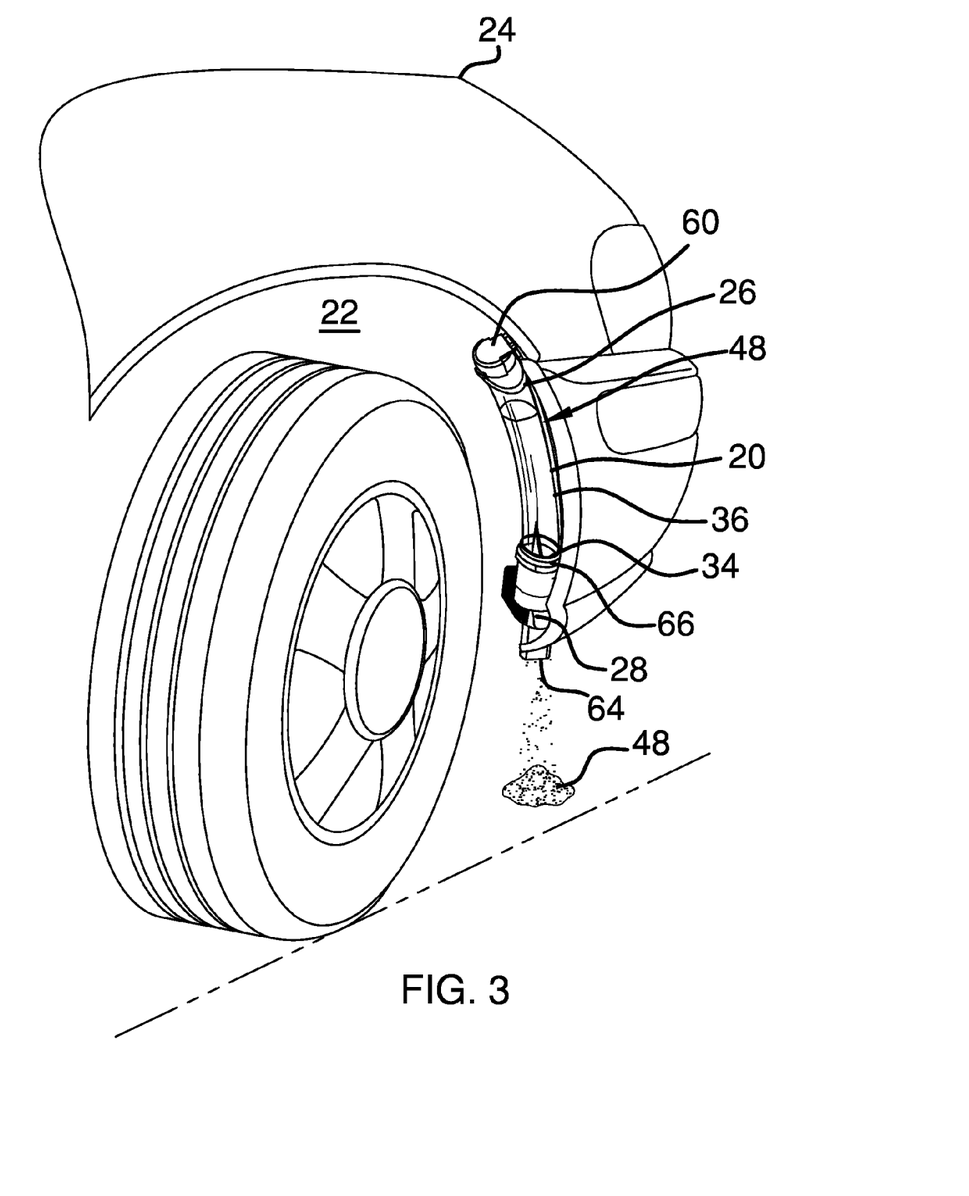
FIG. 3 is an isometric in use view.
Figure 4:
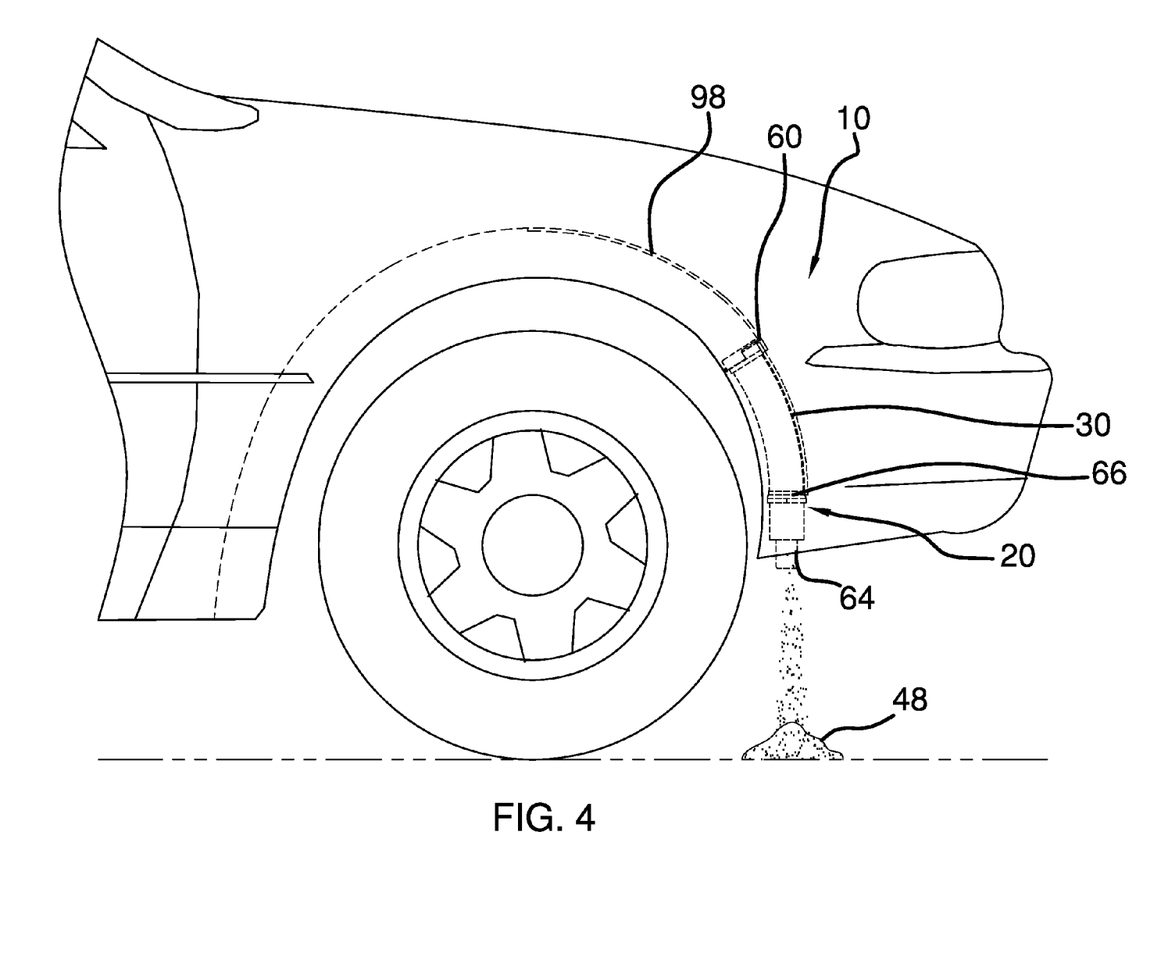
FIG. 4 is an isometric in use view.

It is envisioned that the at least one traction material dispensing unit 20 includes a first traction material dispensing unit 88 and a second traction material dispensing unit 90 disposed within the at least one wheel well 22 of the vehicle 24. The first traction material dispensing unit 88 is disposed proximal a rear 92 of a vehicle wheel 94, while the second traction material dispensing unit 90 is disposed proximal a front 96 of the vehicle wheel 94.

An arched attachment bracket 98 is disposed between and in operational communication with each of the first traction material dispensing unit 88 and the second material dispensing unit 90. The attachment bracket 98 has both a first end 100 and a second end 102. The first end 100 is in operational communication with the perpendicular attachment piece 56 of the first traction material dispensing unit 88 via at least one of the plurality of threaded members 86. Additionally, the second end 102 is in operational communication with the perpendicular attachment piece 56 of the second traction material dispensing unit 90 via at least one of the plurality of threaded members 86. The attachment bracket 98 is configured to mount within the at least one wheel well 22 of the vehicle via the plurality of threaded members 86.

What is claimed is:

1. A vehicle traction material dispensing apparatus comprising:
    at least one of a traction material dispensing unit disposed within at least one of a wheel well of a vehicle, each traction material dispensing unit having each of a storage cartridge, a solenoid housing, and a mounting bracket assembly, the mounting bracket assembly having a plurality of threaded members for mounting the at least one traction material dispensing unit to the at least one wheel well of the vehicle, the solenoid housing having a housing cavity;
    the storage cartridge including a top end spaced apart from a bottom end, a circumferential outer perimeter, and an inner chamber;
    a removable lid of the storage cartridge disposed upon the top end of the storage cartridge;
    a solenoid disposed within the housing cavity of the solenoid housing, the solenoid mechanically engaged with a stopper, the solenoid configured to actuate the stopper, the stopper configured to reversibly enclose a pathway of the solenoid housing, the housing cavity and the inner chamber adjoined,
    the solenoid in operational communication with a receiver, the receiver in operational communication with a vehicle battery, the receiver configured to receive an activation signal from a transmitter, the receiver configured to transmit the activation signal to the solenoid, the solenoid configured to activate upon receipt of the activation signal, the transmitter configured to optionally send the activation signal upon a pressing of a button by a user; and
    a traction material disposed within the inner chamber of the storage cartridge;
    wherein the activation signal is a wireless activation signal.

2. A vehicle traction material dispensing apparatus comprising:
    at least one of a traction material dispensing unit disposed within at least one of a wheel well of a vehicle, each traction material dispensing unit having each of a storage cartridge, a solenoid housing, and a mounting bracket assembly, the mounting bracket assembly having a plurality of threaded members for mounting the at least one traction material dispensing unit to the at least one wheel well of the vehicle, the solenoid housing having a housing cavity;
    the storage cartridge including a top end spaced apart from a bottom end, a circumferential outer perimeter, and an inner chamber;
    a removable lid of the storage cartridge disposed upon the top end of the storage cartridge;
    a solenoid disposed within the housing cavity of the solenoid housing, the solenoid mechanically engaged with a stopper, the solenoid configured to actuate the stopper, the stopper configured to reversibly enclose a pathway of the solenoid housing, the housing cavity and the inner chamber adjoined,
    the solenoid in operational communication with a receiver, the receiver in operational communication with a vehicle battery, the receiver configured to receive an activation signal from a transmitter, the receiver configured to transmit the activation signal to the solenoid, the solenoid configured to activate upon receipt of the activation signal, the transmitter configured to optionally send the activation signal upon a pressing of a button by a user; and
    a traction material disposed within the inner chamber of the storage cartridge;
    wherein the traction material dispensing unit is refillable by the user by removing the lid from the storage cartridge and refilling the storage cartridge with the traction material; and
    wherein the activation signal is a wireless activation signal.

3. The vehicle traction material dispensing apparatus of claim 2 further comprising:
    a seal disposed upon the bottom end of the storage cartridge enclosing the inner chamber proximal the bottom end; and
    a knife disposed within the solenoid housing, the knife configured to puncture the seal of the storage cartridge.

4. The vehicle traction material dispensing apparatus of claim 3 further comprising:
a cylindrical engagement member medially disposed upon the lid, an aperture medially disposed upon the cylindrical engagement member;
the mounting bracket assembly including an arc-shaped bracket having an upper portion and a lower portion, a perpendicular attachment piece disposed upon the upper portion, a hinge disposed upon the attachment piece, a top cover disposed upon the hinge, the top cover configured to rotate upwardly on the hinge, the top cover configured to engage the engagement member of the lid and enclose the aperture of the engagement member.

5. The vehicle traction material dispensing apparatus of claim 4 further comprising:
the solenoid housing including a dispensing door, a connection fitting, a solenoid bracket, the connection fitting reversibly engaged with the bottom end of the storage cartridge, the dispensing door disposed at a lower end of the solenoid housing, the pathway disposed within the dispensing door.

6. The vehicle traction material dispensing apparatus of claim 5 further comprising:
a solenoid mounting bracket disposed upon the solenoid housing, the plurality of threaded members securing the solenoid housing and the top cover to the at least one wheel well of the vehicle.

7. The vehicle traction material dispensing apparatus of claim 6 wherein the stopper is conically shaped.

8. The vehicle traction material dispensing apparatus of claim 7 wherein the seal is composed of tinfoil.

9. The vehicle traction material dispensing apparatus of claim 7 wherein the traction material is selected from the group consisting of salt, sand, magnesium chloride, cat litter, and gravel.

10. A vehicle traction material dispensing apparatus comprising:
at least one of a traction material dispensing unit disposed within at least one of a wheel well of a vehicle, each traction material dispensing unit having each of an arcuate shaped storage cartridge, a solenoid housing, and a mounting bracket assembly;
the storage cartridge including each of a top end spaced apart from a bottom end, a circumferential outer perimeter, and an inner chamber;
a lid of the storage cartridge disposed upon the top end partially enclosing the inner chamber, a cylindrical engagement member medially disposed upon the lid, an aperture medially disposed upon the cylindrical engagement member;
a tinfoil seal disposed upon the bottom end of the storage cartridge enclosing the inner chamber proximal the bottom end, the inner chamber filled with a traction material;
the mounting bracket assembly including an arc-shaped bracket having an upper portion and a lower portion, a perpendicular attachment piece disposed upon the upper portion, a hinge disposed upon the attachment piece, a top cover disposed upon the hinge, the top cover configured to rotate upwardly on the hinge, the top cover configured to engage the engagement member of the lid and enclose the aperture of the engagement member;
the solenoid housing including a housing cavity, a dispensing door, a connection fitting, and a solenoid bracket, the connection fitting reversibly engaged with the bottom end of the storage cartridge, the dispensing door disposed at a lower end of the solenoid housing;
a solenoid disposed within the housing cavity, the solenoid mechanically engaged with a conically shaped stopper, the solenoid configured to actuate the stopper, the stopper configured to reversibly engage the dispensing door fully enclosing a pathway of the dispensing door, the solenoid in operational communication with a receiver, the receiver in operational communication with a vehicle battery, the receiver configured to receive a wireless activation signal from a transmitter, the receiver configured to transmit the activation signal to the solenoid, the solenoid configured to activate upon receipt of the activation signal;
a solenoid mounting bracket disposed upon the solenoid housing, each of the solenoid mounting bracket and the mounting bracket having a plurality of threaded members for mounting each of the solenoid housing and the top cover to the at least one wheel well of the vehicle, the storage cartridge removably disposed between each of the top cover and the connection member of the solenoid housing; and
a knife disposed within the solenoid housing, the knife configured to puncture the tinfoil seal of the storage cartridge.

11. The vehicle traction material dispensing apparatus of claim 10 wherein the at least one of traction material dispensing unit includes a first traction material dispensing unit disposed within at least one of the wheel wells of the vehicle proximal a rear of a vehicle wheel, a second traction material dispensing unit disposed within at least one of the wheel wells of the vehicle proximal a front of a vehicle wheel; and
an arched attachment bracket disposed between and in operational communication with each of the first traction material dispensing unit and the second material dispensing unit, the attachment bracket having a first end and a second end, the first end in operational communication with the perpendicular attachment piece of the first traction material dispensing unit via at least one of the plurality of threaded members, the second end in operational communication with the perpendicular attachment piece of the second traction material dispensing unit via at least one of the plurality of threaded members, the attachment bracket configured to mount within the at least one wheel well of the vehicle.

12. The vehicle traction material dispensing apparatus of claim 11 wherein the traction material is selected from the group consisting of salt, sand, magnesium chloride, cat litter, and gravel.

13. A vehicle traction material dispensing apparatus comprising:
at least one of a traction material dispensing unit disposed within at least one of a wheel well of a vehicle, each traction material dispensing unit having each of an arcuate shaped storage cartridge, a solenoid housing, and a mounting bracket assembly;
the storage cartridge including each of a top end spaced apart from a bottom end, a circumferential outer perimeter, and an inner chamber;
a lid of the storage cartridge disposed upon the top end partially enclosing the inner chamber, a cylindrical engagement member medially disposed upon the lid, an aperture medially disposed upon the cylindrical engagement member;

a tinfoil seal disposed upon the bottom end of the storage cartridge enclosing the inner chamber proximal the bottom end, the inner chamber filled with a traction material;

the mounting bracket assembly including an arc-shaped bracket having an upper portion and a lower portion, a perpendicular attachment piece disposed upon the upper portion, a hinge disposed upon the attachment piece, a top cover disposed upon the hinge, the top cover configured to rotate upwardly on the hinge, the top cover configured to engage the engagement member of the lid and enclose the aperture of the engagement member;

the solenoid housing including a housing cavity, a dispensing door, a connection fitting, a solenoid bracket, the connection fitting reversibly engaged with the bottom end of the storage cartridge, the dispensing door disposed at a lower end of the solenoid housing;

a solenoid disposed within the housing cavity, the solenoid mechanically engaged with a conically shaped stopper, the solenoid configured to actuate the stopper, the stopper configured to reversibly engage the dispensing door fully enclosing a pathway of the dispensing door, the solenoid in operational communication with a receiver, the receiver in operational communication with a vehicle battery, the receiver configured to receive a wireless activation signal from a transmitter, the receiver configured to transmit the activation signal to the solenoid, the solenoid configured to activate upon receipt of the activation signal;

a solenoid mounting bracket disposed upon the solenoid housing, each of the solenoid mounting bracket and the mounting bracket having a plurality of threaded members for mounting each of the solenoid housing and the top cover to the at least one wheel well of the vehicle, the storage cartridge removably disposed between each of the top cover and the connection member of the solenoid housing;

a knife disposed within the solenoid housing, the knife configured to puncture the tinfoil seal of the storage cartridge;

the at least one of traction material dispensing unit including a first traction material dispensing unit disposed within at least one of the wheel wells of the vehicle proximal a rear of a vehicle wheel, a second traction material dispensing unit disposed within at least one of the wheel wells of the vehicle proximal a front of a vehicle wheel; and an arched attachment bracket disposed between and in operational communication with each of the first traction material dispensing unit and the second material dispensing unit, the attachment bracket having a first end and a second end, the first end in operational communication with the perpendicular attachment piece of the first traction material dispensing unit via at least one of the plurality of threaded members, the second end in operational communication with the perpendicular attachment piece of the second traction material dispensing unit via at least one of the plurality of threaded members, the arched attachment bracket configured to mount within the at least one wheel well of the vehicle;

wherein the traction material is selected from the group consisting of salt, sand, magnesium chloride, cat litter, and gravel.

* * * * *